(12) United States Patent
Chetlur et al.

(10) Patent No.: US 11,222,363 B2
(45) Date of Patent: Jan. 11, 2022

(54) COGNITIVE DETERMINATION SYSTEM CONNECTING SOCIAL NETWORK AND BLOCKCHAIN NETWORK

(71) Applicant: International Business Machines Corporation, Armonk, NY (US)

(72) Inventors: Malolan Chetlur, Bangalore (IN); Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 15/836,872

(22) Filed: Dec. 10, 2017

(65) Prior Publication Data

US 2019/0180329 A1    Jun. 13, 2019

(51) Int. Cl.
*G06Q 30/02* (2012.01)
*G06Q 50/00* (2012.01)
*H04L 9/06* (2006.01)

(52) U.S. Cl.
CPC ..... *G06Q 30/0269* (2013.01); *G06Q 30/0239* (2013.01); *G06Q 30/0277* (2013.01); *G06Q 50/01* (2013.01); *H04L 9/0618* (2013.01)

(58) Field of Classification Search
CPC ............... G06Q 30/0269; G06Q 50/01; G06Q 30/0239; G06Q 30/0277; H04L 9/0618; H04L 2209/56; H04L 2209/38; H04L 9/3239
USPC .................................................. 1/1; 705/44
See application file for complete search history.

(56) References Cited

U.S. PATENT DOCUMENTS

| 2014/0025575 A1* | 1/2014 | Chhabra ............. G06Q 20/401 705/44 |
| 2016/0283920 A1 | 9/2016 | Fisher et al. |
| 2017/0132626 A1 | 5/2017 | Kennedy |
| 2017/0154331 A1 | 6/2017 | Voorhees |
| 2017/0200147 A1 | 7/2017 | Ansari |
| 2017/0228822 A1 | 8/2017 | Creighton, IV et al. |
| 2017/0372308 A1* | 12/2017 | Metnick ............. G06Q 20/3829 |
| 2019/0147431 A1* | 5/2019 | Galebach ............. H04L 9/3247 705/44 |

(Continued)

FOREIGN PATENT DOCUMENTS

WO    WO-2018072471 A1 *  4/2018   ....... H04N 21/44236

OTHER PUBLICATIONS

Daan Pepijn, Blockchain can make social networks more private—and profitable for you, 2017 (Year: 2017).*

(Continued)

*Primary Examiner* — Tarek Elchanti

(57) ABSTRACT

An example operation may include one or more of receiving an identification of vendor resources held by each of a plurality of members of a social network, extracting respective preference information of the plurality of members from web pages associated with the plurality of members on the social network, automatically determining to exchange resources of a first vendor issued to a first member of the social network with resources of a second vender issued to a second member of the social network based on extracted preference information of the first and second members, and triggering execution of the exchange of resources via one or more blockchain computing networks associated with the social network.

18 Claims, 6 Drawing Sheets

(56) References Cited

U.S. PATENT DOCUMENTS

2020/0019288 A1* 1/2020 D'Amore ............. G06Q 10/101

OTHER PUBLICATIONS

S. E. Udegbe, "Impact Of Blockchain Technology In Enhancing Customer Loyalty Programs In Airline Business," Retrieved from Internet using: http://www.ijiras.com/2017/Vol_4-Issue_6/paper_44.pdf.
Wikipedia: "Bitcoin—Wikipedia", Aug. 16, 2017 (Aug. 16, 2017), Retrieved from the Internet using: https://en.wikipedia.org/w/index.php?title=Bitcoin.
Wikipedia: "Blockchain—Wikipedia", Aug. 16, 2017 (Aug. 16, 2017), Retrieved from the Internet using: https://en.wikipedia.org/w/index.php?title=Blockchain.
Antorweep Chakravorty, and Chunming Rong, "Ushare: user controlled social media based on blockchain," Proceedings of the 11th International Conference on Ubiquitous Information Management and Communication. ACM, 2017. Retrieved from Internet using: http://www.academia.edu/download/51303259/7-4._Ushare_User_Controlled_Social_Media_based_on_Blockchain.pdf.

* cited by examiner

COGNITIVE DETERMINATION SYSTEM CONNECTING SOCIAL NETWORK AND BLOCKCHAIN NETWORK

TECHNICAL FIELD

This application generally relates to connecting a social networking website with a blockchain network, and more particularly, to a cognitive determination system connecting social network and blockchain network.

BACKGROUND

A blockchain may be used as a public ledger (or private ledger) to store transactional information within a database. Transactions are executed within a blockchain database when it is determined that certain conditions are satisfied. The results of the transaction are stored in a database which is replicated (i.e., distributed) across multiple blockchain nodes. Because any individual or entity can provide information to a public blockchain, this information should be reviewed and confirmed. This review operation is known as consensus. Blockchain systems typically rely on a decentralized consensus which transfers authority and trust to a decentralized network and enables its nodes (i.e., blockchain peers) to continuously and sequentially record their transactions on a public "block", creating a unique "chain" referred to as a blockchain. Cryptography, via hash codes, is used with a blockchain to secure an authentication of a transaction source and removes the need for a central intermediary.

Web-based social networks (e.g., FACEBOOK®, LINKEDIN®, TWITTER®, GOOGLE+®, etc.) enable users to make social connections through social media platforms. Social networks establish interconnected online web-based communities that assist users in making contacts for the purposes of business, health, education, and the like. These contacts are often people that users likely would not have met except for the online relationship established through the social network. Within a social network, members are often connected to one another via direct and indirect relationships. Online social networks have provided a unique environment for cutting edge technologies which are being developed to take advantage of the limitless potential that is provided by social networks.

SUMMARY

In one example embodiment, provided is a computing system that includes one or more of a network interface that may receive an identification of respective vendor resources held by a plurality of members of a social network, and a processor that may extract respective preference information of the plurality of members from web pages associated with the plurality of members on the social network, automatically determine to exchange resources of a first vendor issued to a first member of the social network with resources of a second vendor issued to a second member of the social network based on extracted preference information of the first and second members, and trigger execution of the exchange of resources via a blockchain computing network associated with the social network.

In another example embodiment, provided is a method that includes one or more of receiving, by a processing device, an identification of respective vendor resources held by a plurality of members of a social network, extracting respective preference information of the plurality of members from web pages associated with the plurality of members on the social network, automatically determining, by the processing device, to exchange resources of a first vendor issued to a first member of the social network with resources of a second vender issued to a second member of the social network based on extracted preference information of the first and second members, and triggering, by the processing device, execution of the exchange of resources via a blockchain computing network associated with the social network.

In another example embodiment, provided is a non-transitory computer readable medium having stored therein program instructions that when executed cause a computer to perform one or more of receiving, by a processing device, an identification of respective vendor resources held by a plurality of members of a social network, extracting respective preference information of the plurality of members from web pages associated with the plurality of members on the social network, automatically determining, by the processing device, to exchange resources of a first vendor issued to a first member of the social network with resources of a second vender issued to a second member of the social network based on extracted preference information of the first and second members, and triggering, by the processing device, execution of the exchange of resources via a blockchain computing network associated with the social network.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

Figure 1:
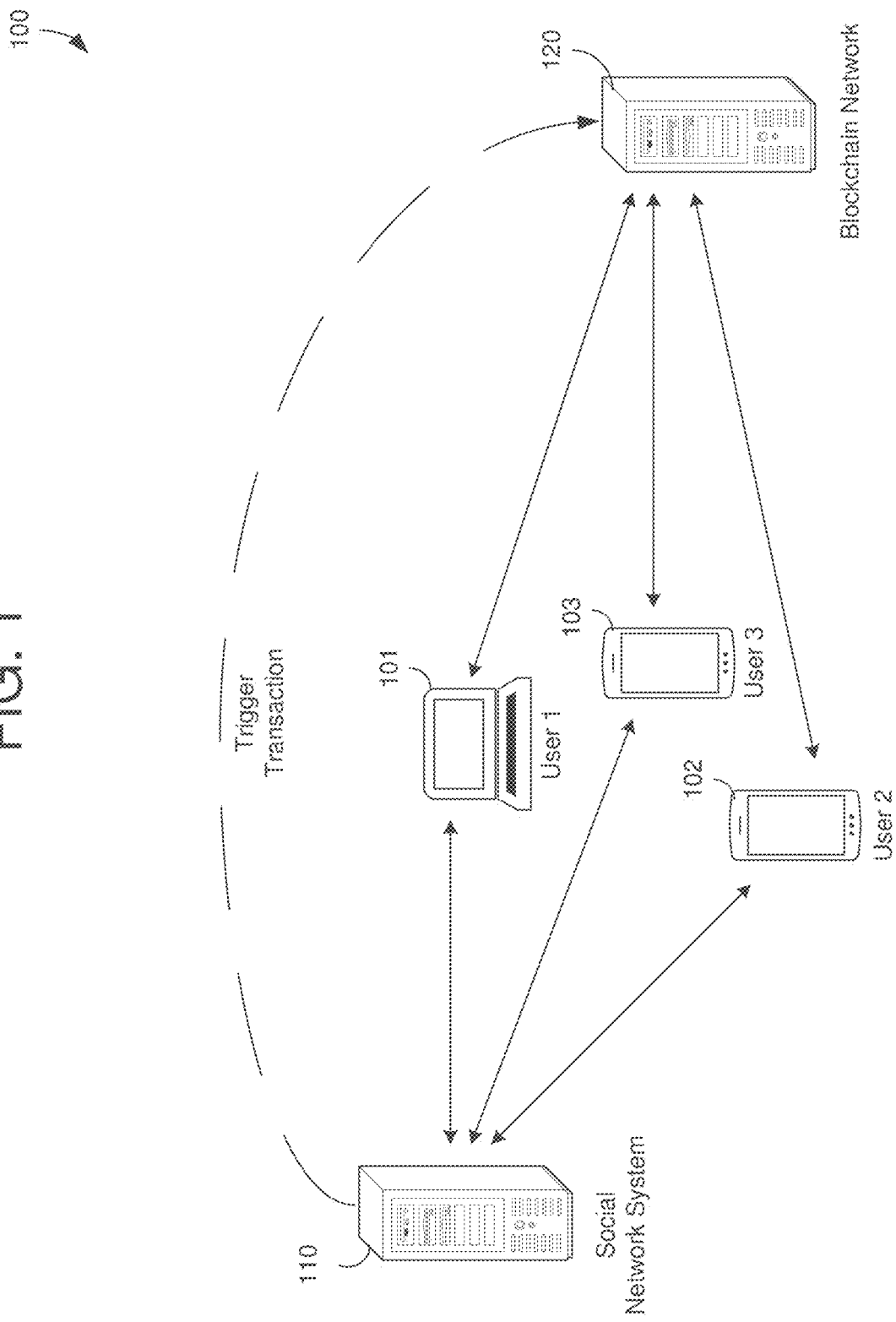
FIG. 1 is a diagram illustrating a system including a social network and a blockchain network in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to blockchain transactions, and in another embodiment relates to a software program that connects a social network with a blockchain network by detecting opportunities where it is beneficial for users related to one another on the social network to exchange resources on the blockchain network. The software program (also referred to herein as a cognitive system) may be stored on and executed by a social networking site host server or some other device or database associated with the social networking site (e.g., cloud, remote database, etc.) Meanwhile, the resources described herein may refer to vendor resources that are issued to and held by a user. The user may be a member of the social network and may have contacts who are other members on the social network. The resources may include coupons, rewards, gifts, bonuses, and the like. The resources may have a face value such as a dollar amount that is exchangeable for credits with the merchant for purchasing items for sale from the merchant such as goods and services.

A vendor resource such as a coupon is typically only redeemable at the vendor's stores, whereas a monetary instrument such as cash is typically more widely accepted as a generic form of currency by all vendors. One of the problems addressed by the example embodiments is facilitating access to and use of coupons not being utilized and the marketing effort being wasted by vendors. Coupons or other vendor resources may be issued on a blockchain network to one or more users. The cognitive system may receive a listing of coupons that have been issued on the blockchain network. Furthermore, the cognitive system may learn user preferences from the social network (e.g., web pages, data, etc.) of the member on the social network to determine if a coupon is more valuable to a friend, and conversely a friend's coupon is more valuable to the user. In such a scenario, an exchange is mutually beneficial, and is also beneficial to the vendors involved. The cognitive system identifies the beneficial exchange and further facilitates such an exchange of coupons between two or more participants issued by two or more vendors/companies.

Credits and discounts issued by product vendors have little or no insight into the social connectedness or influence of a customer on the target credits they receive. While word-of-mouth continues to be one of the best and cheapest marketing strategies, vendors struggle to tap into the social connectedness of their customers to improve their client pool. The example embodiments improve usage of credits with trusted and verifiable exchange of the issued credits within users of a social network. The cognitive system enhances the value of vendor resources within peer-to-peer marketing and product recommendation with online credits. Furthermore, the system can identify and learn about influencers and actual consumers of issued credits within social networks. The system provides a verifiable and equitable interchange of credits within social communities. The interchange is stored on publicly accessible blockchain allowing companies/vendors to determine which users/members of the social network prefer which products/services giving companies insight into the social network and influence of their customers. Furthermore, the example embodiments assist vendors in expanding their client pool.

FIG. 1 illustrates a system 100 in which a social network 110 is integrated with a blockchain network 120 in accordance with an example embodiment. For example, the system 100 may include one or more social networking systems 110 such as web servers that host social networking sites (e.g., FACEBOOK®, LINKEDIN®, TWITTER®, GOOGLE+®, etc.) The social networking sites may include members which are linked to one another via relationships (e.g., friends, work, contacts, family, etc.) within the social network. In the example of FIG. 1, the members of the social network access the social network via user devices 101-103. In this example, a first user 101, a second user 102, and a third user 103 are members of a social network hosted by social network system 110. The user devices may be mobile devices such as laptops, mobile phones, tablets, smart wearables, and the like. As another example, the user devices may be desktop computers, appliances, televisions, and the like. The user devices may be connected to the social network system 110 via a network such as the Internet, a private network, and the like.

According to various aspects, vendors such as merchants and other organizations may issue vendor resources such as coupons, credits, gifts, bonuses, and the like, via one or more blockchain networks represented by blockchain network 120. Resources may be issued to individual users or groups of users. An example of the blockchain network 120 architectures is further described with respect to FIG. 2. The blockchain network 120 may transmit a listing of vendor resources issued to members of the social network to the social network system 110 or other devices associated therewith, and in particular, to the cognitive service associated with the social networking system 110 described herein.

The cognitive service may identify a listing of members that are associated with one another directly and/or indirectly on the social network, and also identify the vendor resources that they each hold. Here, the cognitive system ascertains/estimates value of a particular coupon to a user. For example, the first user 101 may hold a coupon F1 and the second user 102 may hold a coupon F2. In this example, the cognitive system may determine that the first user 101 may derive more value from coupon F2 (because the first user 101 may not want to purchase products that coupon F1 applies to) and the second user 102 derives more value with coupon F1 (because the second user 102 may not want to purchase products that coupon F2 applies to). In this proposed example, an exchange is mutually beneficial. It doesn't need to be of "equitable" value, as both parties are happier after the exchange.

As merely a non-limiting example, the first user 101 may hold a $10 off on shampoo credit and the second user 102 may hold a $20 off on perfume (from different vendors). The cognitive system may determine that the first user 101 will not likely use the coupon for the shampoo based on his social networking data such as images (e.g., bald/shaved head, etc.) or from preference information identified from comments, attributes, or the like. However, the cognitive system may determine that the second user 102 has a wife that might enjoy the perfume, and that the second user 102 purchases products for females such as his wife on a regular basis. Likewise, the cognitive system may determine that the second user 102 doesn't intend to purchase perfume, but is interested in shampoo. The cognitive system ascertains these preferences and proposes a mutual exchange. Both users derive more "value" after such as an exchange. There are benefits to the vendors as well, as outlined in the disclosure charts. Beyond estimating whether a person is interested in a product/vendor/coupon, the cognitive system may also determine whether that coupon is useful for one of the person's connections based on their preferences and interests. If the second user's coupon is a better fit for the first user, and vice-versa, based on the cognitive algorithms, then an exchange is mutually beneficial.

In the example of FIG. 1, the first user 101 and the second user 102 may be contacts with respect to one another. In other words, the first and second users 101 and 102 may be directly connected to one another (i.e., a first order connection on the social network). As another example, the first user 101 and the second user 102 may not be directly connected to one another. However, the cognitive system may identify an indirect connection (i.e., second or third order connection) between the first user 101 and the second user 102 via one or more intermediate users such as user 103. Here, the third user 103 may be directly connected to both the first user 101 and the second user 102 thereby creating an indirect bridge between the first and second users 101 and 102.

Once a mutually beneficial exchange is identified, the cognitive system may ask both (or all) users to record their consent for the exchange. The coupons are issued on a blockchain network 120. Accordingly, each user may record their consent for the exchange on a smart contract. For example, the user may provide their authorization for the exchange after verifying that the coupon they are receiving is in fact valid and not expired (they verify this on the blockchain). Once consent is received from all parties for the exchange, cognitive system may trigger the smart contract on the blockchain to automatically transfer (i.e., execute) ownership of the coupons. This ensures that no one is cheated in the exchange and the first user 101 cannot run away with the second user's 102 coupon without exchanging their own coupon.

Figure 2:
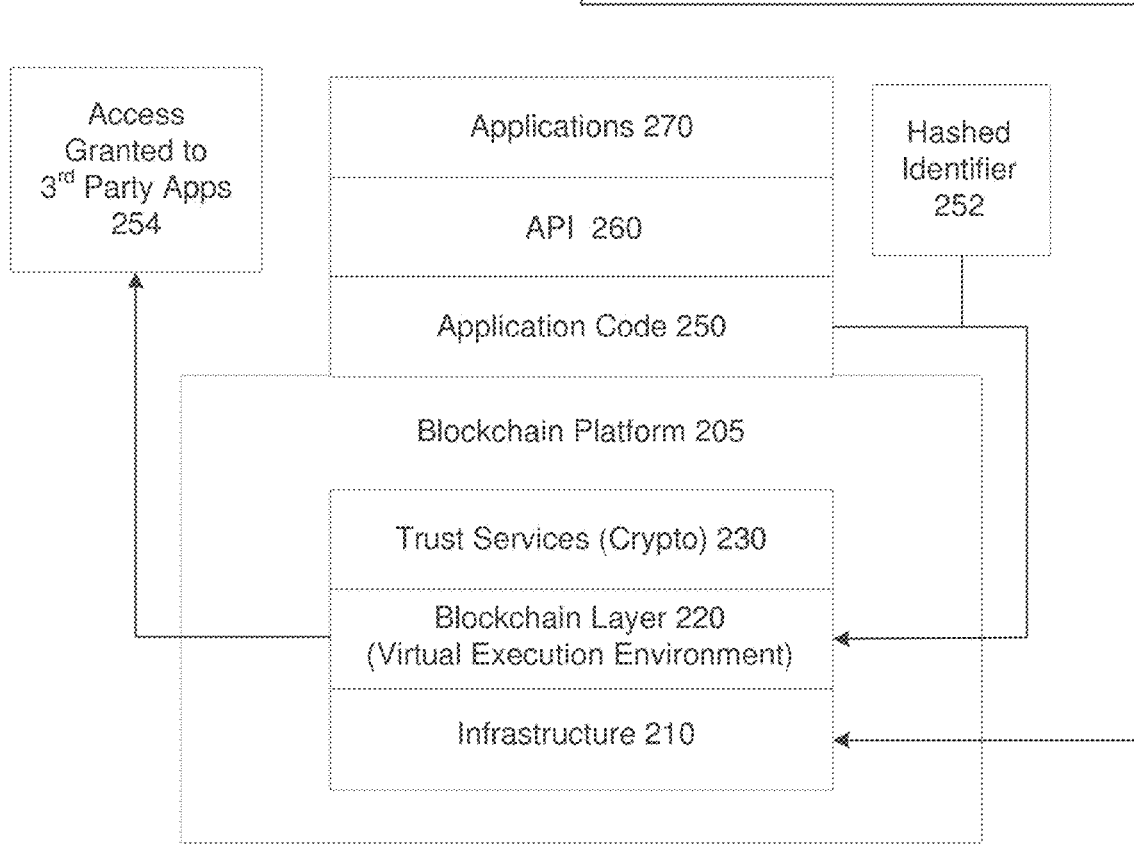
FIG. 2 is a diagram illustrating a blockchain system configuration in accordance with an example embodiment.

FIG. 2 illustrates a blockchain system database configuration, according to example embodiments. Referring to FIG. 2, blockchain system 200 may include certain common blockchain elements, for example, a group 280 of assigned peer blockchain nodes 281-284 which participate in blockchain transaction addition and validation process (consensus). As an example, the blockchain network 120 shown in FIG. 1 may include one or more peer blockchain nodes 281-284, etc. Any of the blockchain peer nodes 280 may initiate a blockchain authentication and seek to write to a blockchain immutable ledger stored in blockchain layer 220, a copy of which may also be stored on the underpinning physical infrastructure 210. In this configuration, the customized blockchain configuration may include one or applications 270 which are linked to application programming interfaces (APIs) 260 to access and execute stored program/application code (e.g., chain code and/or smart contracts) 250, which are created according to the customized configuration sought by the participants and can maintain their own state, control its own assets, and receive external information. This code can be deployed as a transaction and installed, via appending to the distributed ledger, on all blockchain peer nodes.

The blockchain base or platform 205 may include various layers of blockchain data, services (e.g., cryptographic trust services, virtual execution environment), and underpinning physical computer infrastructure necessary to receive and store new transactions such as vendor resources exchange transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain configuration of FIG. 2 may process and execute program/application code 250 by way of one or more interfaces exposed, and services provided, by blockchain platform 205. The code may control blockchain assets. For example, the code can store and transfer data, and may be executed by the blockchain in the form of a smart contract and associated chain code with conditions or other code elements subject to its execution. The smart contracts 250 may be created to execute reminders, updates, and/or other notifications subject to the changes, updates, etc. The smart contracts can themselves be used to identify rules associated with authorization and access requirements and usage. For example, hashed identifier information 252 received from a user device may be processed by one or more processing entities (virtual machines) included in the blockchain layer 220. The result may include access being granted 254 to a third party application from the blockchain computing environment (VM). In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a social networking service that is capable of triggering execution of an exchange of vendor resources such as coupons, rewards, gift cards, etc. As described herein, a smart contract is executable code which is registered, stored, and/or replicated with a blockchain (e.g., distributed network of blockchain peers). A transaction is an execution of the smart contract code which can be performed in response to conditions associated with the smart contract being satisfied or the social networking service triggering the smart contract. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain.

The code may be used to create a temporary data structure in a virtual machine or other computing platform. Data written to the blockchain can be public or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 3:
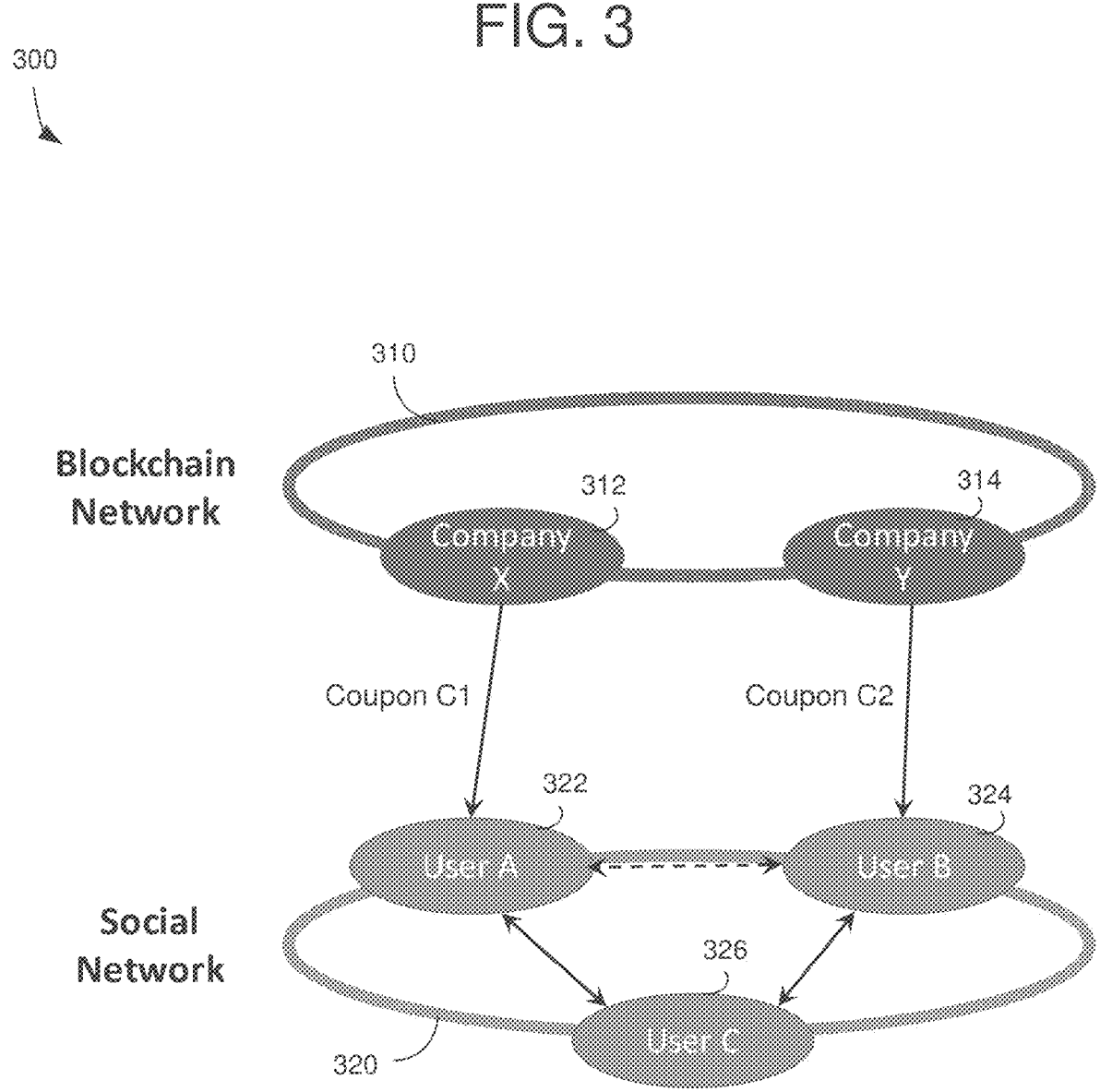
FIG. 3 is a diagram illustrating a process connecting a blockchain network and a social network in accordance with an example embodiment.

FIG. 3 illustrates a process 300 connecting a blockchain network and a social network in accordance with an example embodiment. FIG. 3 illustrates an example in which the user A 322 and user B 324 can be directly connected as friends/contacts with each other on the social network 320, and also an example in which user A 322 and user B 324 are indirectly connected to each other on the social network 320 via an intermediate user C 326. In the example of FIG. 3, a first company 312 issues a coupon C1 to user A 322 and a second company 314 issues a coupon C2 to user B 324 via a blockchain network 310. The identification of the coupons and the holder of the coupons may be stored on the blockchain network 310 along with security information associated with the issuance of the coupons. Here, the first and second companies 312 and 314 may be separate and distinct vendors. The coupons C1 and C2 may be issued on the blockchain network 310 via a smart contract.

In the example of FIG. 3, the blockchain network 310 is connected to the social network 320 via the cognitive system described herein. The users preferences and an equitable value of the coupons issued to each user and other users is determined from knowledge about the users gleaned from by the cognitive system from the social network 320 including web pages of data about each of the users. The connections between users is also on the social network. The social network helps the cognitive system determine which friends' coupons are useful to another member and vice-versa to propose an exchange. The exchange may be through a direct connection (e.g., user A 322 to user B 324) and the exchange can also be multi-way in which a user C 326 who doesn't have coupons of their own can suggest an exchange between user A 322 and user B 324 who aren't directly connected to each other. In the multi-way example, user C 326 may realize that an exchange of coupons between user A 322 and user B 324 is beneficial and can recommend it to them. In this example, user A 322 and user B 324 have authorized user C 326 to access their preferences in the respective social networks to determine that an exchange is beneficial.

In this example, the blockchain network 310 may not directly connect to the social network 320. Rather, the cognitive system may connect the two network. For example, the cognitive system may interleave the blockchain network 310 and the social network 320 through the following steps: coupons are issued on a blockchain network, a value of the coupons to each user is determined from the social network, the cognitive system identifies any friends with whom a mutual exchange is beneficial (on social network), each user in the proposed exchange can validate each others coupon as valid on the blockchain network and also authorize the exchange, and the exchange of coupons happens on the blockchain network through a smart contract.

Furthermore, the blockchain network 310 may record information about successful vendor resource exchanges and also record the participants (social network members) involved. Participants with a wider social network and with greater influence are likely to influence (directly or indirectly) greater exchanges. Conversely, information about successful coupon exchanges can reveal a notion of social influence. By awarding coupons to well-connected users, the vendors such as company X 312 and company Y 314 can improve the reach of their marketing as these users could transfer the coupons to others. Further, the exchange also helps expand the marketing and potential client pool for companies issuing coupons. For example, company X 312 may issue a coupon to user A 322 while never being aware of user B 324. But, the coupon exchange between the two users has now introduced user B 324 as a buyer for company X 312. Company X can in the future direct coupons/marketing campaigns to user B 324 directly, and user A 322 can be incentivized for introducing user B 324 to company X 312.

Figure 4:
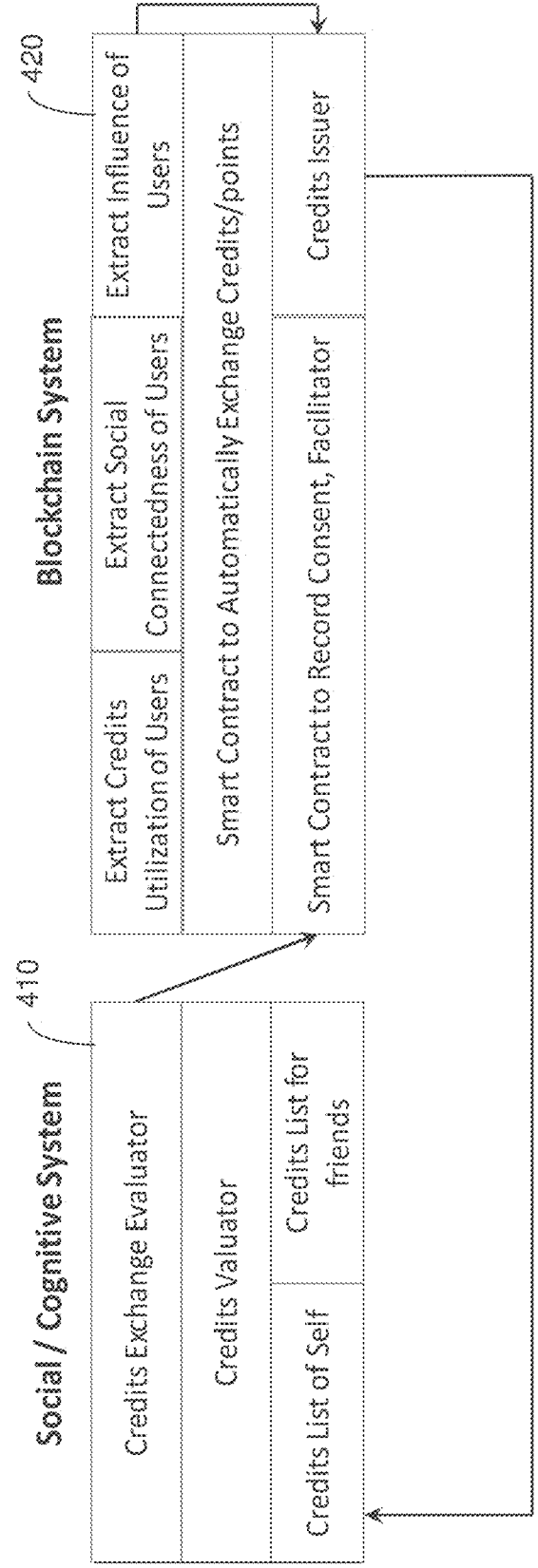
FIG. 4 is a diagram illustrating different processes performed by a blockchain network and by a social network in accordance with an example embodiment.

FIG. 4 illustrates an example of different processes 400 performed by a blockchain network and by a social network in accordance with an example embodiment. In the example of FIG. 4, processes 410 may be performed by the cognitive system associated with the social network and processes 420 may be performed by the blockchain network. The cognitive system may receive a list of credits maintained or held by each member and the member's friends from the blockchain where the issued credits are stored. The cognitive system processes 410 can included determining an equitable value of the credits with the member and the member's friends based on preferences of the members gleaned from their respective social networking pages. Accordingly, the cognitive system may determine that an exchange of vendor credits between two members of the social network is mutually beneficial. The cognitive system can make this determination based on the determined equitable value of the credits to each of the members based on preferences of the members gleaned from their social networking pages and preferences.

Meanwhile, in addition to recording the credits/coupons issued to the members of the social network and providing a listing of these credits to the cognitive system, the blockchain system processes 420 may include recording an exchange of credits between two users on the blockchain in response to receiving a trigger from the cognitive system. Furthermore, the blockchain system can identify how each user is using their credits, extract social connectedness of each user based on the exchanges that the user is involved in (directly or indirectly), and determine influence of the user. Accordingly, future coupons and marketing may be determined based on one or more of these factors.

Figure 5:
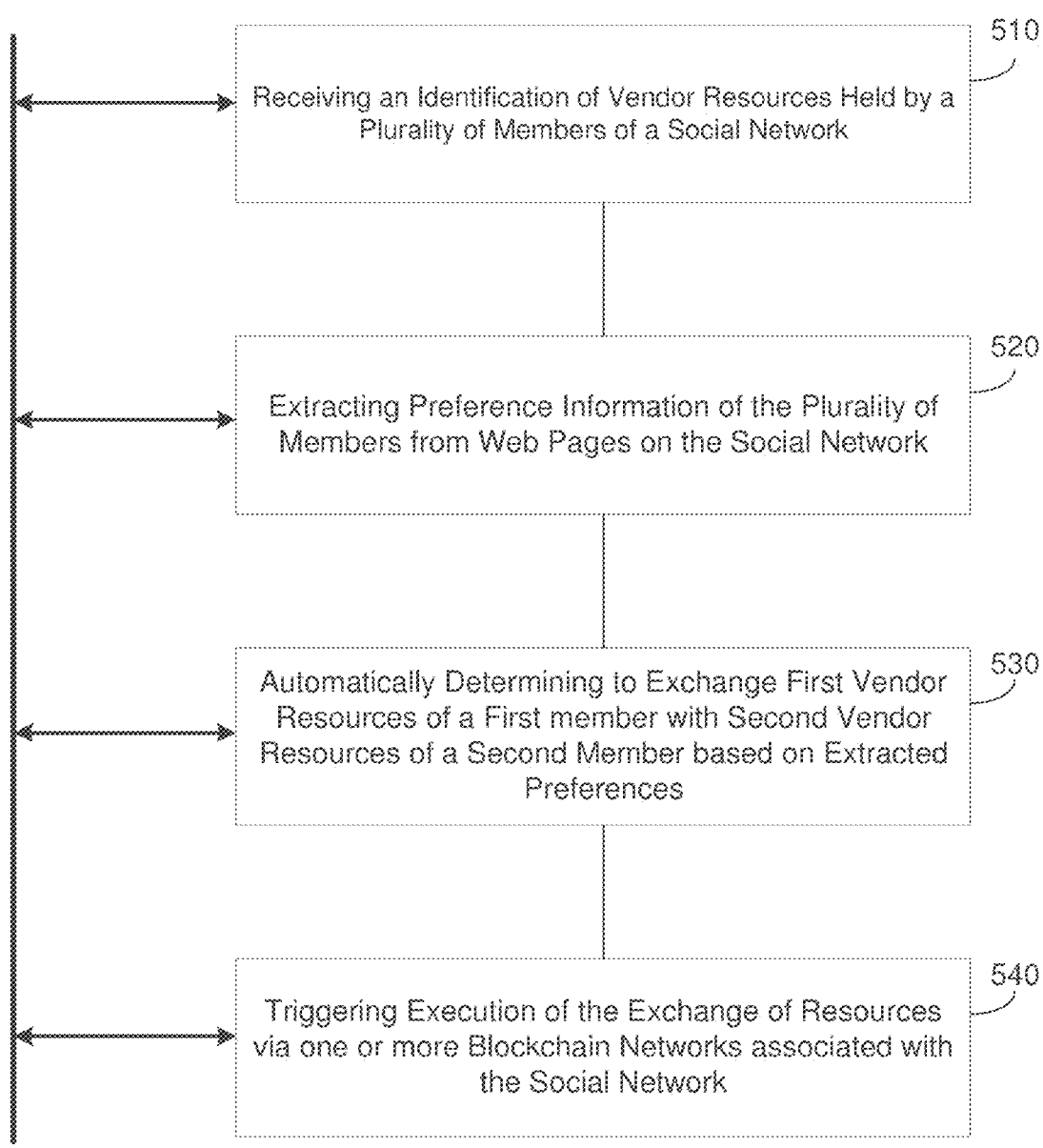
FIG. 5 is a diagram illustrating a method for cognitively determining an exchange of assets based on social network activity in accordance with an example embodiment.

FIG. 5 illustrates a method 500 for cognitively determining an exchange of assets based on social network activity in accordance with an example embodiment. For example, the method 500 may be performed by a software program executing on a computing system including a processing device such as a social networking host server, a blockchain system, a user device, a combination thereof, and the like. In 510, the method includes receiving an identification of respective vendor resources held by a plurality of members of a social network. Here, the identification of the vendor resources held by each member or a group of members may be provided by a host server of the social network site. For example, the vendor resources may include coupons, discounts, gift cards, rewards, and the like, which have been issued to or otherwise transferred to a member of the social network. The vendor may refer to a merchant who sells items such as goods or services. Also, the vendor resources may be stored on one or more blockchains. As an example, a merchant may issue a coupon to a user via a transaction that is stored on a blockchain associated with the merchant. The blockchain may be accessed by multiple vendors thereby providing a common platform at which coupons and other benefits can be stored and accessed.

In 520, the method includes extracting respective preference information of the plurality of members from web pages associated with the plurality of members on the social network. For example, the preference information may include products and/or services that a member is interested in which may be gleaned or otherwise determined from information stored on the member's web page of the social networking website. As another example, the preference information may be determined from previous posts and other interactions of the user on the social networking site. For example, the preference information may be determined from comments, descriptions, images, interests, and the like, of the member which are stored and available via an application programming interface (API) of the social networking sit. In addition to determining products and services that the member desires, the method may also determine products or services that the member dislikes and is not interested in. Preference information extracted from the social network may be stored in a database, file, table, etc., and associated with a particular member ID. Accordingly, the preference information may be quickly and efficiently accessed by the service.

In 530, the method includes automatically determining two members or more who are candidates for an exchange of vendor resources. For example, the method may determine to exchange resources of a first vendor (e.g., coupons, rewards, gift cards, etc.) issued to a first member of the social network with resources of a second vender issued to a second member of the social network based on preference information of the first and second members extracted from their respective pages on the social networking site. In this example, the first member and the second member may be directly connected to each other via a relationship on the social network site such as "friends," "coworkers," "contacts," and the like. As another example, the first member and the second member may not be directly connected to one another but may be indirectly connected to each other via an intermediate member who is directly connected to the first and second members.

In some embodiments, the automatically determining may include determining an equitable value of the resources of the first vendor to the second member and an equitable value of the resources of the second vendor to the first member, and determining to perform the exchange based on the determined equitable values. In this example, the equitable value of the resources of the first vendor to the second member may include determining a different value than an actual value of the resources of the first vendor held by the first member based on preferences of the second member, and vice versa. The equitable value may be a determination as to how valuable the discount or reward is to the second member based on the preferences of the second member. Also, in some embodiments, an actual value of the resources of the first vendor held by the first member may be different than an actual value of the resources of the second vendor held by the second member.

In 540, the method includes triggering execution of the exchange of resources via a blockchain computing network associated with the social network. Although not shown in FIG. 5, in some embodiments, the method may further include receiving authorization to execute the exchange of resources from user devices associated with the first and second members, and triggering the execution of the exchange only in response to receiving the authorization.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
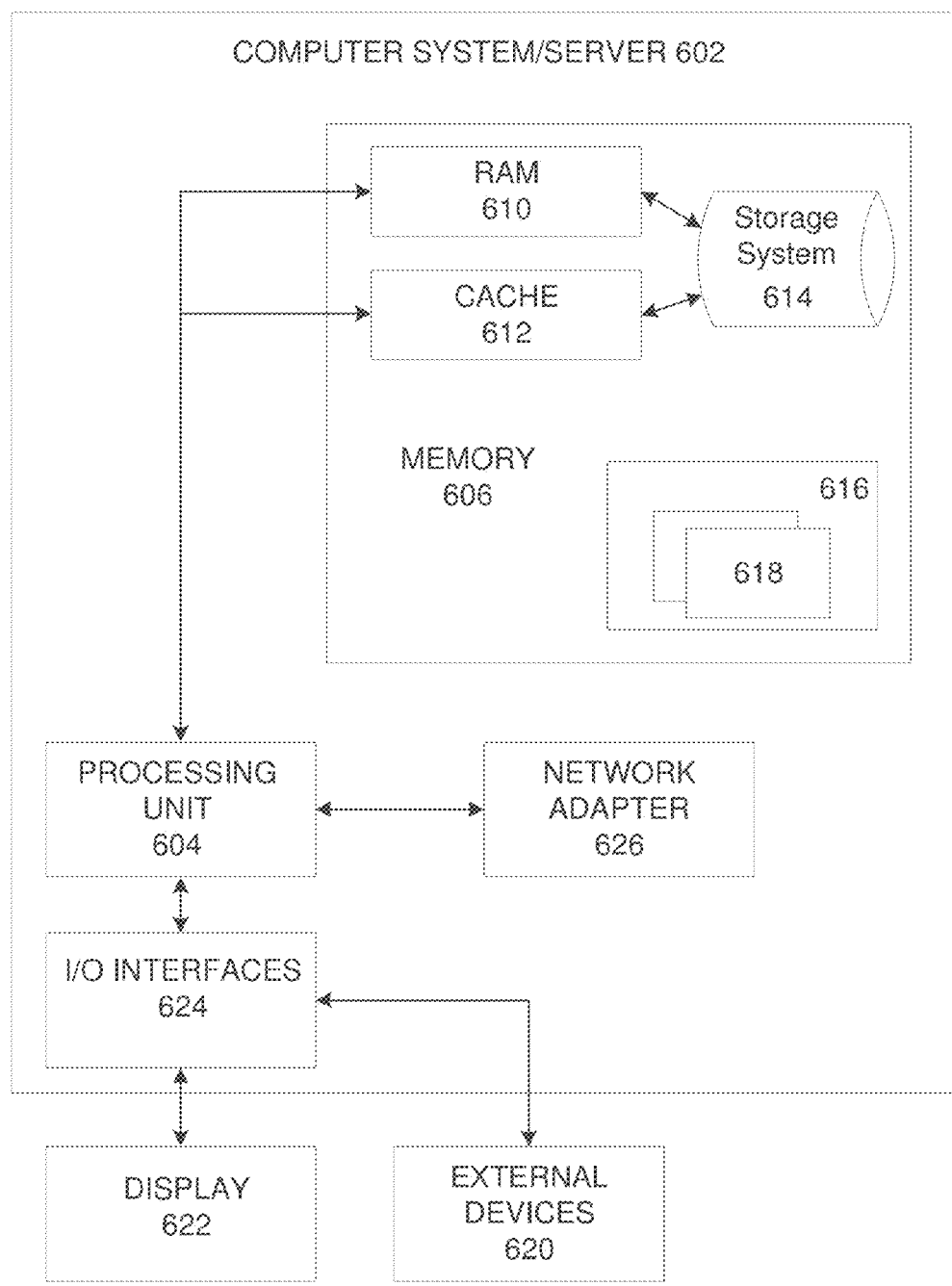
FIG. 6 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc. The computer system 600 may be a single device or a combination of devices. For example, the computer system 600 may be a social networking host computing system, a blockchain node, a database, a server, a cloud platform, a network, a combination thereof, and the like.

FIG. 6 is not intended to suggest any limitation as to the scope of use or functionality of embodiments of the application described herein. Regardless, the computing system 600 (or node 600) is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in computing node 600 is shown in the form of a general-purpose computing device. The components of computer system/server 602 may include, but are not limited to, one or more processors or processing units 604 (i.e., processors), a system memory 606, and a bus that couples various system components including system memory 606 to processor 604. The computing node 600 may be the social networking system 110 shown in FIG. 1 or another device or combination of devices such as a server, cloud platform, database, and/or the like. Also, the computing node 600 may perform each of the method 500 shown in FIG. 5.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626 (also referred to as a network interface). As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Referring to FIG. 6, the network interface 626 may receive an identification of respective vendor resources held by a plurality of members of a social network. For example, the network interface 626 may receive a list of all members of the social network, vendor resources held by each member, contacts of each member, and the like. The list may be generated by the social networking service. Here, the computing system node 600 may be the host social networking server or it may be a device that is directly connected or network connected to the host social networking server. The vendor resource information of the members of the social network may be stored in the memory 606.

According to various embodiments, the processor 606 may extract respective preference information of the plurality of members from web pages associated with the plurality of members on the social network. Here, the processor 606 may extract the preferences from web pages of the member which are live on the social network site or which are stored in a database associated with the social network. In addition, the processor 606 may automatically determine to exchange resources of a first vendor issued to a first member of the social network with resources of a second vender issued to a second member of the social network based on extracted preference information of the first and second members, and trigger execution of the exchange of resources via a blockchain computing network associated with the social network. In some embodiments, the processor 6060 may receive authorization to execute the exchange of resources from user devices associated with the first and second members, and only trigger the execution of the exchange in response to receiving the authorization. In this example, the first member and the second member may be directly connected or indirectly connected to one another via the social networking site.

In some embodiments, the processor 606 may determine an equitable value of the resources of the first vendor with respect to the second member and an equitable value of the resources of the second vendor with respect to the first member. For example, if the processor 606 determines that the equitable value of the first vendor resources is higher to the second member (i.e., the second member is more interested in the first vendor resources) and the equitable value of the second vendor resources is higher to the first member than the second member, the processor 606 may determine to perform the exchange based on the determined equitable values. In this example, the processor 606 may determine that the equitable value of the resources of the first vendor is a different value than an actual value of the resources of the first vendor based on preferences of the members. For example, the processor 606 may determine, for the first member, that the first vendor resources have a lower equitable value than the actual value. As another example, the processor 606 may determine, for the second member, that the first vendor resources have a higher equitable value than the actual value.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A computing system comprising:
   a processing device configured to execute a service running on a host server of an external network that communicably connects a blockchain network to the host server of the external network;
   the processing device is further configured to
   receive, via the service, a list of participants of the blockchain network,
   detect, via the service, preference information of the list of participants of the blockchain network from web pages of the external network exposed via an application programming interface (API) of the external network,
   determine, via the service, a blockchain transaction to execute between at least two participants of the blockchain network based on the preference information detected from the web pages of the external network,
   detect, via the service, consent to execute the blockchain transaction from the at least two participants, wherein the consent is recorded in and detected from a smart contract of the blockchain network, and the smart contract comprises executable code which is registered, stored, and replicated with a plurality of peers of the blockchain network; and
   invoke, via the service running on the host server of the external network, execution of logic within the smart contract of the blockchain network which reads key values for processing the blockchain transaction from a blockchain distributed among the plurality of peers of the blockchain network and writes the blockchain transaction to the blockchain distributed among the plurality of peers of the blockchain network.

2. The computing system of claim 1, wherein the processing device is further configured to receive authorization to execute the blockchain transaction from user devices associated with the at least two participants.

3. The computing system of claim 1, wherein the processing device is configured to determine personal preferences of the at least two participants based on respective interactions of the at least two participants included in the web pages of the external network.

4. The computing system of claim 1, wherein the processing device is configured to store the preference information in a data structure, and associate the preference information in the data structure with user IDs of the external communication network.

5. The computing system of claim 4, wherein the processing device is configured to access the preference information in the data structure when determining the blockchain transaction to execute.

6. The computing system of claim 1, wherein the at least two participants are directly connected via a social relationship in the external network.

7. The computing system of claim 1, wherein the at least two participants are indirectly connected via one or more intermediate social relationships in the external network.

8. The computing system of claim 1, further comprising a network interface configured to receive a list of resources stored on the blockchain which have been previously issued to the list of participants.

9. A computer-implemented method, comprising:
executing, by a processing device, a service running on a host server of an external network that communicably connects a blockchain network to the host server of the external network;
receiving, via the service, a list of participants of the blockchain network;
detecting, via the service, preference information of the list of participants of the blockchain network from web pages of the external network exposed via an application programming interface (API) of the external network;
determining, via the service, a blockchain transaction to execute between at least two participants of the blockchain network based on the preference information detected from the web pages of the external network;
detecting, via the service, consent to execute the blockchain transaction from the at least two participants, wherein the consent is recorded in and detected from a smart contract of the blockchain network, and the smart contract comprises executable code which is registered, stored, and replicated with a plurality of peers of the blockchain network; and
invoking, via the service running on the host server of the external network, execution of logic within the smart contract of the blockchain network which reads key values for processing the blockchain transaction from a blockchain distributed among the plurality of peers of the blockchain network and writes the blockchain transaction to the blockchain distributed among the plurality of peers of the blockchain network.

10. The computer-implemented method of claim 9, further comprising receiving authorization to execute the blockchain transaction from user devices associated with the at least two participants.

11. The computer-implemented method of claim 9, wherein the determining comprises determining personal preferences of the at least two participants based on respective interactions of the at least two participants included in the web pages of the external network.

12. The computer-implemented method of claim 9, further comprising storing the preference information in a data structure, and associating the preference information in the data structure with user IDs of the external network.

13. The computer-implemented method of claim 12, further comprising accessing the preference information in the data structure when determining the blockchain transaction to execute.

14. The computer-implemented method of claim 9, wherein the at least two participants are directly connected via a social relationship in the external network.

15. The computer-implemented method of claim 9, wherein the at least two participants are indirectly connected via one or more intermediate social relationships in the external network.

16. The computer-implemented method of claim 9, further comprising receiving a list of resources stored on the blockchain which have been previously issued to the list of participants.

17. A non-transitory computer readable medium having stored therein program instructions that when executed cause a computer to perform a method comprising:
executing, by a processing device, a service running on a host server of an external network that communicably connects a blockchain network to the host server of the external network;
receiving, via the service, a list of participants of the blockchain network;
detecting, via the service, preference information of the list of participants of the blockchain network from web pages of the external network site exposed via an application programming interface (API) of the external network;
determining, via the service, a blockchain transaction to execute between at least two participants of the blockchain network based on the preference information detected from the web pages of the external network;
detecting, via the service, consent to execute the blockchain transaction from the at least two participants, wherein the consent is recorded in and detected from a smart contract of the blockchain network, and the smart contract comprises executable code which is registered, stored, and replicated with a plurality of peers of the blockchain network; and
invoking, via the cognitive service running on the host server of the external network, execution of logic within the smart contract of the blockchain network which reads key values for processing the blockchain transaction from a blockchain distributed among the plurality of peers of the blockchain network and writes the blockchain transaction to the blockchain distributed among the plurality of peers of the blockchain network.

18. The non-transitory computer readable medium of claim 17, wherein the method further comprises receiving authorization to execute the blockchain transaction from user devices associated with the at least two participants.

* * * * *